(12) United States Patent
Suzuki et al.

(10) Patent No.: US 7,161,629 B2
(45) Date of Patent: Jan. 9, 2007

(54) ELECTRONIC CAMERA AND METHOD FOR CALCULATING AN EXPOSURE AMOUNT

(75) Inventors: Masahiro Suzuki, Inzai (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 738 days.

(21) Appl. No.: 09/840,913

(22) Filed: Apr. 25, 2001

(65) Prior Publication Data
US 2001/0013903 A1    Aug. 16, 2001

Related U.S. Application Data

(63) Continuation of application No. 08/854,347, filed on May 12, 1997, now abandoned.

(30) Foreign Application Priority Data
May 13, 1996  (JP) ................................. 8-117277

(51) Int. Cl.
*H04N 5/235* (2006.01)
(52) U.S. Cl. .................................. 348/362; 348/221.1
(58) Field of Classification Search ............ 348/229.1, 348/221.1, 296, 298, 362, 363, 364, 365
See application file for complete search history.

(56) References Cited

U.S. PATENT DOCUMENTS

| | | | |
|---|---|---|---|
| 4,584,610 A * | 4/1986 | Mizokami et al. ....... 348/229.1 |
| 4,647,975 A * | 3/1987 | Alston et al. ............ 348/222.1 |
| 5,162,913 A * | 11/1992 | Chatenever et al. ........ 348/298 |
| 5,309,243 A | 5/1994 | Tsai |
| 5,353,058 A | 10/1994 | Takei |
| 5,386,231 A * | 1/1995 | Shimizu et al. ............. 348/296 |
| 5,486,861 A | 1/1996 | Miyamoto et al. |
| 5,510,837 A * | 4/1996 | Takei ......................... 348/362 |
| 5,638,123 A | 6/1997 | Yamaguchi |
| 5,767,904 A | 6/1998 | Miyake |
| 5,828,793 A * | 10/1998 | Mann ...................... 348/222.1 |

* cited by examiner

*Primary Examiner*—David Ometz
*Assistant Examiner*—Luong T. Nguyen
(74) *Attorney, Agent, or Firm*—Oliff & Berridge, PLC

(57) ABSTRACT

In an electronic camera, an exposure amount S (1/2000 sec.), an exposure amount M (1/250 sec.) and an exposure amount L (1/30 sec.) are set in vertically synchronous signal timing directly before the fourth frame, the fifth frame, and the sixth frame. In the frame directly following that setting, exposure is performed corresponding to that exposure amount. The signal levels obtained from the three exposure amounts are compared in the eighth frame, and an added value α is added to the shutter time in which the signal level obtained is closest to the optimum signal level. This time is set in vertically synchronous signal timing directly before the ninth frame. In the ninth frame, exposure is performed corresponding to this setting. In the tenth frame, the signal is readout according to this exposure. In the eleventh frame, the signal calculation is performed. The processing is repeated in the same way thereafter and the optimum exposure amount is determined.

12 Claims, 9 Drawing Sheets

| LEVEL E | α (EV) |
|---|---|
| OVER 200 | $-\frac{3}{2}$ |
| 160 ≤ E < 200 | −1.0 |
| 140 ≤ E < 160 | $-\frac{1}{2}$ |
| 132 ≤ E < 140 | $-\frac{1}{4}$ |
| 125 ≤ E < 132 | |
| 118 ≤ E < 125 | $+\frac{1}{4}$ |
| 100 ≤ E < 118 | $+\frac{1}{2}$ |
| 70 ≤ E < 100 | +1.0 |
| LESS THAN 70 | $+\frac{3}{2}$ |

FIG. 5

ELECTRONIC CAMERA AND METHOD FOR CALCULATING AN EXPOSURE AMOUNT

INCORPORATION BY REFERENCE

This is a Continuation of application Ser. No. 08/854,347 filed May 12, 1997 now abandoned. The entire disclosure of the prior application(s) is hereby incorporated by reference herein in its entirety.

The disclosures of the following priority application is herein incorporated by reference: Japan Application No. 08-117277, Filed May 13, 1996.

BACKGROUND OF THE INVENTION

1. Field of the Invention

The present invention relates to an electronic camera, and more particularly relates to an electronic camera that speedily calculates exposure without using special exposure sensors.

2. Description of Related Art

In common silver-salt cameras, special sensors calculate the exposure based on the output of those sensors.

In order to design lower cost electronic cameras, the exposure is calculated from the output of the imaging element without providing special sensors.

FIG. 7 is one example of exposure calculation operation. In step S61, operation is in standby until an unspecified period of time has elapsed. For example, after the electrical power source is turned on from an imaging element such as a CCD in FIG. 8, when an NTSC method is used, a readout operation is performed on the image data of each frame at $\frac{1}{30}^{th}$ of a second per frame. However, the CCD output is unstable for the initial three frames. Therefore, there is a standby time (i.e., waiting time) from the first through third frames in order to wait for the CCD output to stabilize.

When the unspecified period of time has elapsed, operation advances to step S62 to set the preset default exposure amount. For example, in the event the stop is fixed, a prescribed shutter speed is set.

In step S63, exposure is performed only for the time corresponding to the shutter speed setting. That is, the electrical load that occurs in the period of time corresponding to the shutter speed is produced and a readout is performed in step S64. In order to perform the exposure and readout in one frame-length components (as in FIG. 8), when the exposure (step S63) is performed in a prescribed frame (e.g., the third frame), the readout (step S64) is performed in the next frame (e.g., the fourth frame).

In step S65, the signal level readout from step S64 is judged to determine whether it is the optimum value. If it is not an optimum value, operation advances to step S66 and a preset added value α is added to the value set in step S62 and the new value is a new set value. Then, operation returns to step S63 and exposure is performed corresponding to the new set value.

The calculation for determining the new set value is performed in the frame (e.g., the fifth frame) that follows the readout frame.

This operation is performed in repetition until the readout signal level from step S65 is judged to be at an optimum value and then the photography preparation is complete.

The optimum exposure value is generally determined in conventional electronic cameras in three operations, namely an exposure process, a readout process and a calculation process. However, these processes are time-consuming. Further, in video cameras, it is rare to take in only one frame of an image so that even though the process to calculate the exposure, in order to photograph images of at least several seconds or more in length, took time, it did not present a practical problem. However, problems exist in electronic cameras where the image is basically a one-frame image so that when it takes time for the exposure calculation to be done on several tens of frames, the photography of images is troublesome.

SUMMARY OF THE INVENTION

The present invention calculates the optimum exposure more rapidly than prior art cameras.

In one embodiment, the first output of a photoreceptor device is determined when a first exposure amount is set by the setting device and the subject is photographed. A second output of the photoreceptor device is determined when the second exposure amount is set by the setting device and the subject is photographed. The first and second output are compared and the one that is closest to the optimum exposure amount is selected. The optimum exposure amount may be determined based on the output of the photoreceptor device. The selected exposure amount may be changed incrementally by only a prescribed value that is sufficiently smaller than the difference between the first exposure amount and the second exposure amount.

In one embodiment, the first output and a second output are compared. The one that is closest to the optimum exposure amount is selected. Then, the optimum exposure amount is determined based on the output of the photoreceptor device when the exposure amount is altered incrementally by only a prescribed value from the selected exposure amount.

Other objects, advantages and salient features of the present invention will become apparent from the detailed description of the invention taken in conjunction with the annexed drawings.

BRIEF DESCRIPTION OF THE DRAWINGS

The invention will be described with reference to the following drawings in which like reference numerals refer to like elements and wherein:

FIG. 5 shows a relation between the signal level and the added value α;

DETAILED DESCRIPTION OF PREFERRED EMBODIMENTS

Figure 1:
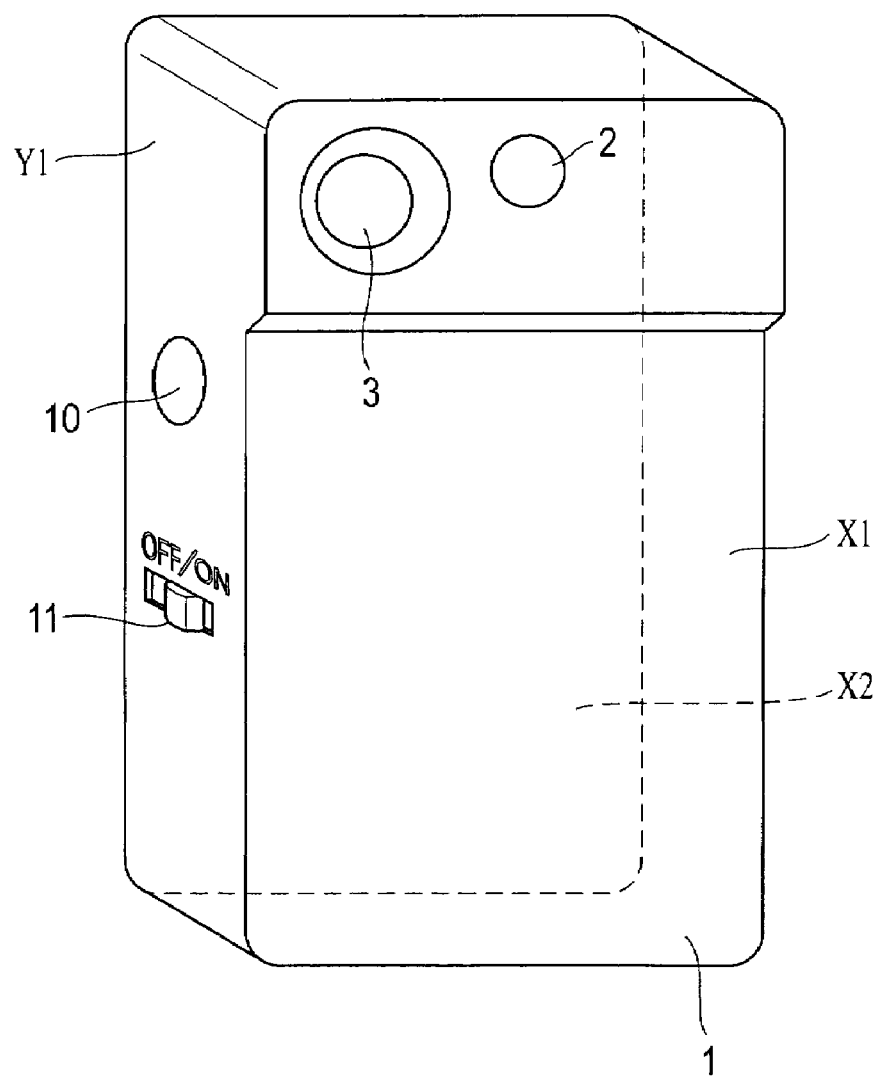
FIG. 1 is an oblique view showing the composition of one embodiment of an electronic camera according to the present invention.

FIG. 1 is an oblique view showing the composition of an electronic camera according to the present invention. In the electronic camera 1, the surface facing toward the subject is surface X1. Surface X2 is toward the side of the user. A finder 2 at the upper end of the surface X1 confirms the photographic scope of the subject. Camera 1 further includes a photographic lens 3 that takes in light images from the subject.

A release switch 10 is provided on surface Y1 for operation during photography of the subject. An electrical power source switch 11 is further provided. The release switch 10 and electrical power source switch 11 are positioned on the side below the finder 2 and the photographic lens 3.

Figure 2:
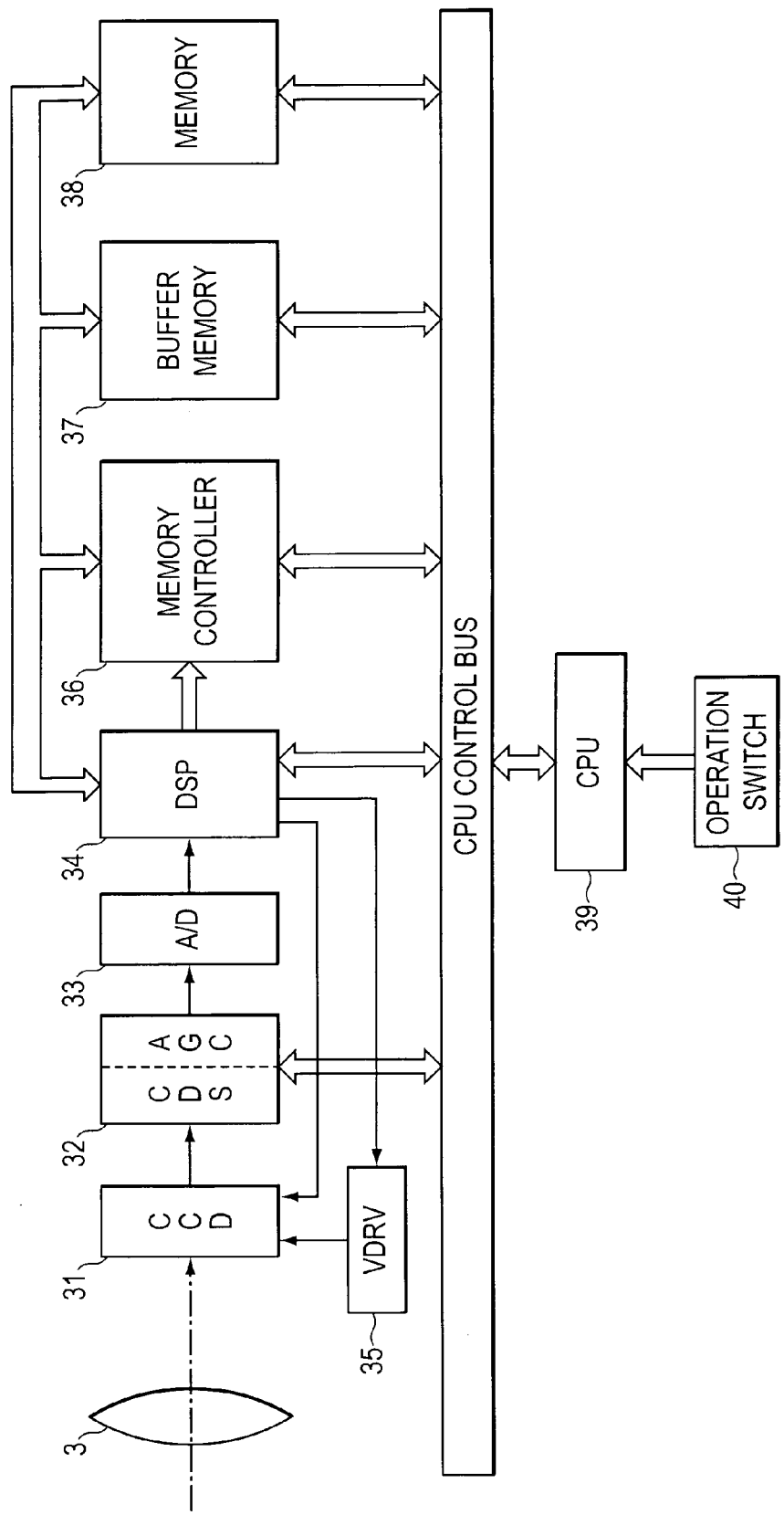
FIG. 2 is a diagram showing the internal electrical composition of the electronic camera of FIG. 1.

The electrical composition of the electronic camera 1 is explained with reference to FIG. 2. A CCD 31 is provided with several pixels that photoelectrically converts the light image received on each pixel into an image signal (i.e., electrical signal). CCD drive circuit (VDRV) 35 is controlled by a digital signal processor DSP 34 to drive the CCD 31.

A correlated dual sampling circuit (CDS) and an AGC circuit 32 in conjunction with sampling by specified timing of the imaging signal photoelectrically converted by the CCD 31, control this level to a specified level. The analog/digital converter circuit (A/D converter circuit) 33 digitalizes the image signals sampled by the CDS circuit and the AGC circuit 32 and supplies the digitized image signals to the DSP 34.

The DSP 34 performs gamma correction and the like on the input R, G, and B image data as well as calculates the luminance data and the chrominance difference data from this data. Further, the DSP 34 supplies data to the buffer memory 37 where the data is recorded. A compression/expansion circuit and a memory controller 36 compress image data stored in the buffer memory 37 into JPEG format and transfer the compressed image data to a memory card 38 where the data is stored.

Various orders from the release switch 10 and the electrical power source switch 11 (the operation switch 40 in FIG. 2) can be input to the CPU 39. The CPU 39 controls each circuit corresponding to these orders via the CPU control bus.

Figure 3A:
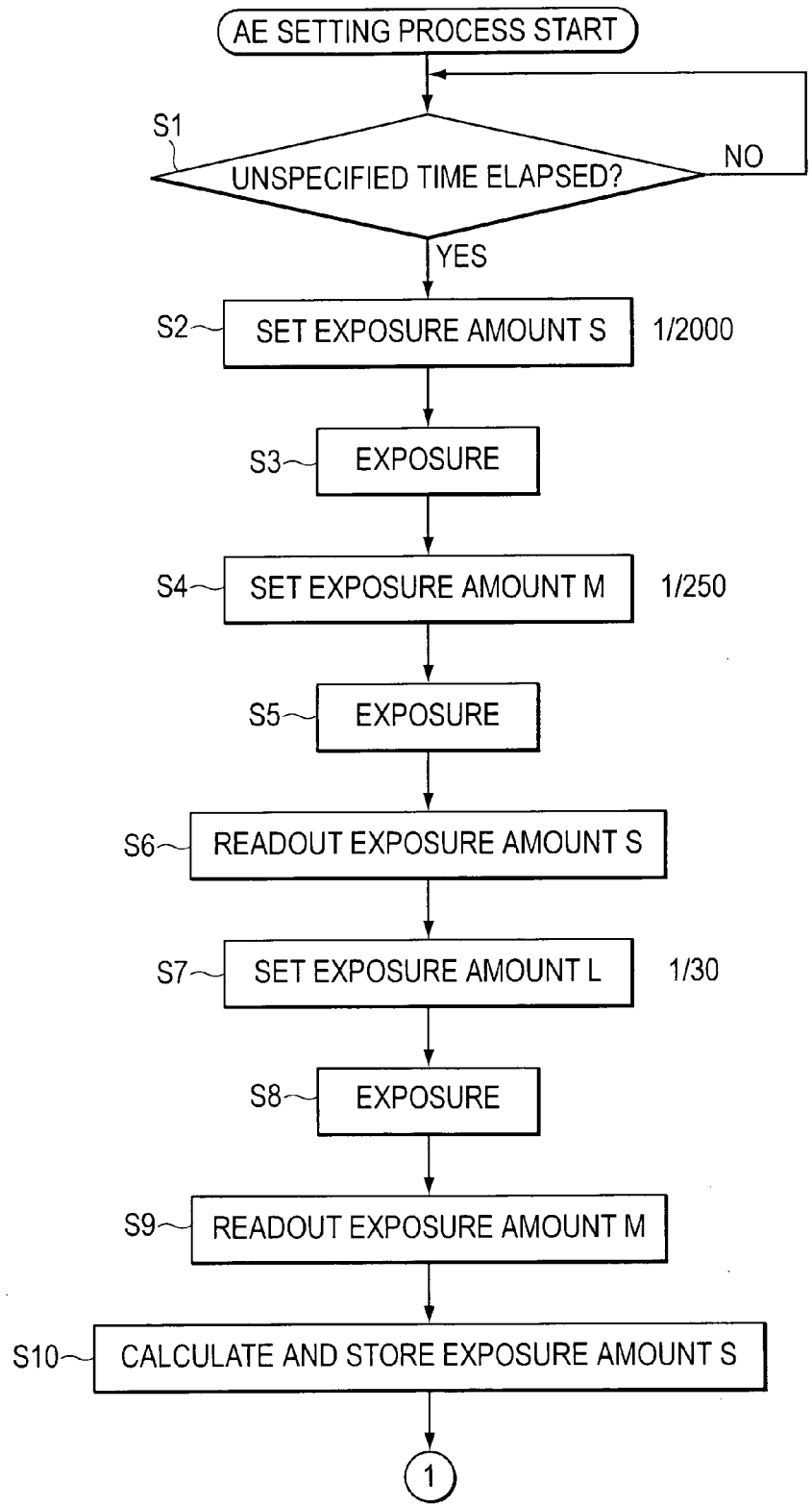
FIGS. 3*a*–3*b* are flow charts explaining the operation of the FIG. 2 embodiment.
Figure 3B:
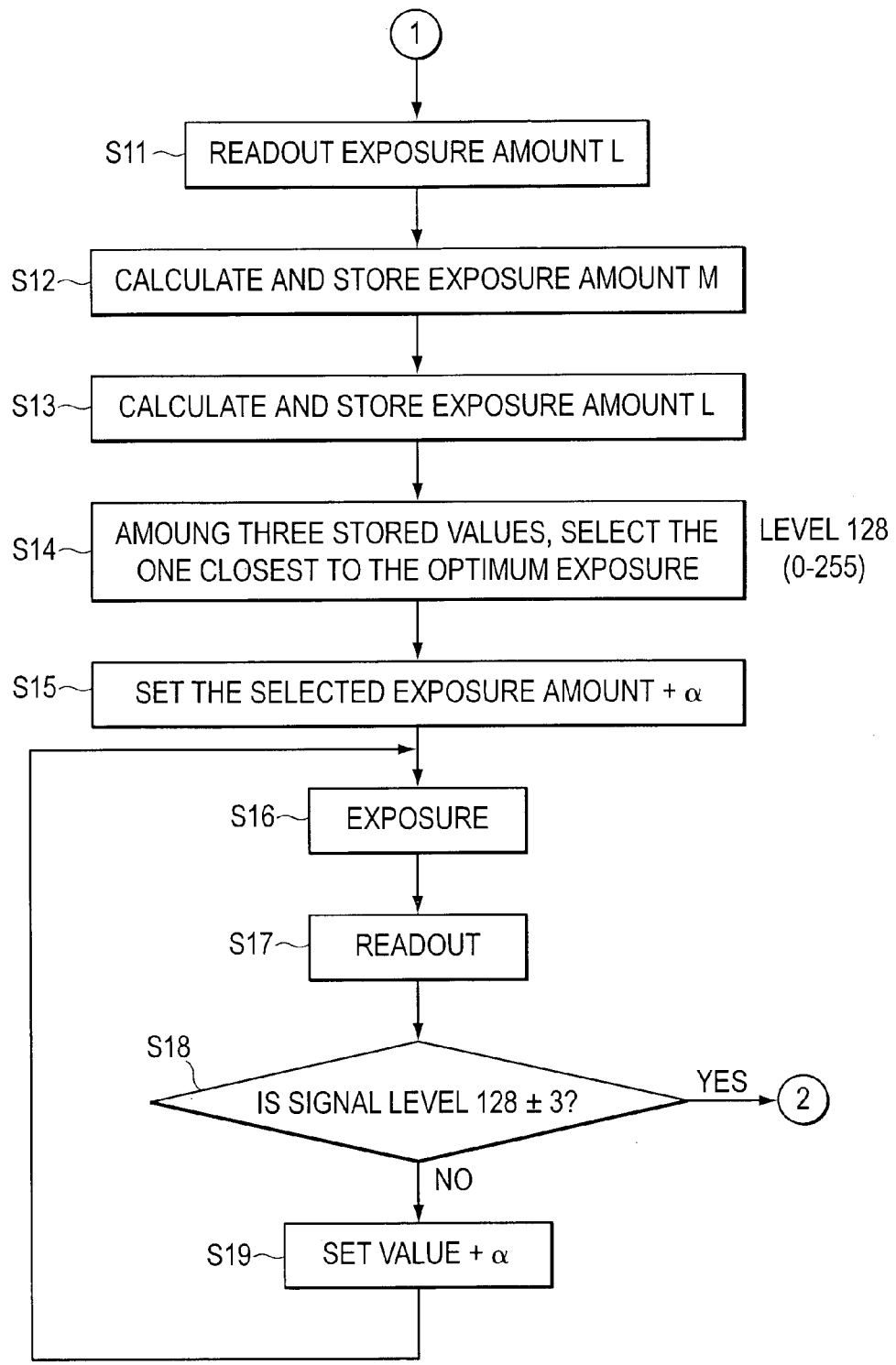
Figure 4:
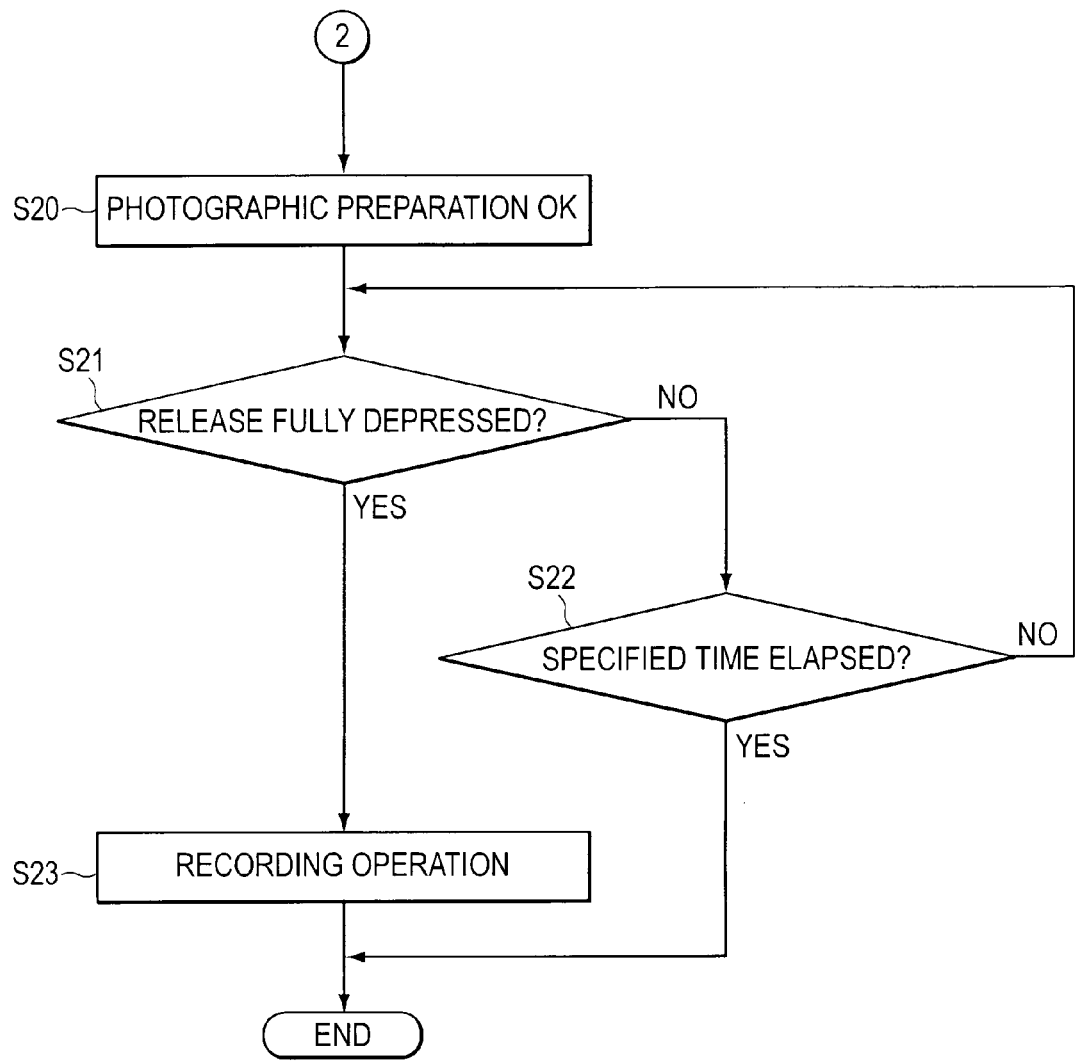
FIG. 4 is a flow chart continuing from FIG. 3.

The operation of calculating the exposure amount will now be described with respect to FIGS. 3a, 3b and 4. This operation begins when the user puts the release switch 10 in a semi-depressed state.

In step S1, after the release switch 10 is in a semi-depressed state, there is standby until an unspecified period of time has elapsed. This unspecified period of time may be equal to three frames, for example.

In step S2, the CPU 39 controls the DSP 34 and sets the exposure amount S. As an example, when the stop is fixed, the shutter speed may be set at $\frac{1}{2000}$ of a second.

In step S3, exposure is performed based on the exposure amount set in step S2. That is, the CPU 39 controls the DSP 34 and an electrical signal load is accumulated in the CCD 31 for $\frac{1}{2000}$ of a second.

In step S4, the exposure amount M is set. The exposure amount M may be set at a shutter time of $\frac{1}{250}^{th}$ of a second, for example. In step S5, exposure is performed based on the exposure amount set in step S4. The operation is performed when the electrical signal load has accumulated only for $\frac{1}{250}^{th}$ of a second in the CCD 31. Then, a readout operation is executed on the charged signal load in step S6 based on the exposure corresponding to the exposure amount S performed in step S3.

In step S7, the exposure amount L is set. The exposure amount L may be set at a shutter time of $\frac{1}{30}^{th}$ of a second. In step S8, a signal load is accumulated in the CCD 31 only for $\frac{1}{30}^{th}$ of a second. In step S9, a readout operation is performed on the signal load accumulated based on the exposure corresponding to the exposure amount M performed in step S5.

In step S10, the signal level is calculated corresponding to the exposure amount S that was readout in step S6. The signal level is then stored in the buffer memory 37.

In step S11, a readout is performed of the electrical load according to the exposure amount L performed in step S8. In step S12, the signal level obtained as the result of the exposure based on the exposure amount M is calculated and stored in the buffer memory 37.

In step S13, a calculation is performed on the signal level obtained from the exposure corresponding to the exposure amount L (step S8). The signal level is then stored in the buffer memory 37.

The signal levels obtained as the result of the exposure corresponding to the exposure amounts S, M, or L are compared in step S14. The amount closest to the optimum exposure is selected. For example, when 256 signal levels exist (0 to 255), the middle value (level 128) may be defined as the optimum exposure. In that case, the signal level closest to level 128 is selected.

In step S15, the CPU 39 adds a preset prescribed added value α to the exposure amount selected in step S14, to set a new exposure amount. This value α may be determined, as shown in FIG. 5.

That is, when the signal level E (step S14) is over 200, α is defined as $-\frac{3}{2}$ (EV). When the level E is above 160 but under 200, the value α is −1.0. When the level E is over 140 but under 160, the value α is $-\frac{1}{2}$ and when the level E is over 132 but under 140, the value α is defined as $-\frac{1}{4}$. Further, when the level E is over 118 but under 125, α is $\frac{1}{4}$. When the level E is over 100 but under 118, α is $\frac{1}{2}$. When the level E is over 70 but under 100, α is 1.0. When the level E is under 70, α is defined as $\frac{3}{2}$. Then, when level E is over 125 but less than 132, the signal level with an optimum exposure amount has been determined and an α value is not set (i.e., defined as 0).

In FIG. 5, the value of α is shown as EV. However, the shutter time is actually defined as corresponding to this EV value.

The new exposure amount is set in step S15 and operation advances to step S16 to perform exposure based on the set exposure amount. Then, operation advances to step S17 and the readout is performed on the signal load corresponding to the exposure from step S16. In step S18, the signal level is judged to be within the range of 128±3 (i.e., whether the value is above 125 and under 132). In step S18, when the signal level is not within the range of 128±3, operation advances to step S19 where an added value α is added to the shutter time set in step S15 to define a new set value. Then, operation returns to step S16 and the processing is executed.

Steps S16-step S19 are executed in repetition until the signal level enters the range of 128±3 (step S18).

When the signal level is within the range of 128±3 in step S18, operation advances to step S20 and the CPU 39 performs processing when the photography preparation has been completed. In step S21, it is determined whether the release switch 10 is in a full depression state. When the release switch 10 is not in a full depression state, operation advances to step S22 to determine whether a preset specified time has elapsed. When the specified time has not yet elapsed, operation returns to step S21 to repeat steps S21 and S22.

When the release switch 10 is in a full depression state in step S21, operation advances to step S23 and the CPU 39 executes the photographing operation with the exposure amount set from step S15 or step S19. That is, the DSP 34 accumulates a signal load only for the time corresponding to the shutter time selected with regard to the CCD 31. This signal load is readout by the CDS circuit and the AGC circuit 32 and the level is controlled to a specified level. Then, it is A/D converted in the A/D converter circuit 33 after which in conjunction with executing gamma correction and the like, the brightness data and the chrominance data are calculated in the DSP 34, and stored in the buffer memory 37. The compression/expansion circuit and the memory controller 36 readout the image data stored in the buffer memory 37 and compress it into JPEG format. The compressed image data is then transferred to the memory card 38 where it is stored.

On the other hand, after the release switch 10 is in a half-depression state in step S22. The CPU 39 terminates the operation when a specified time has elapsed.

Figure 6:
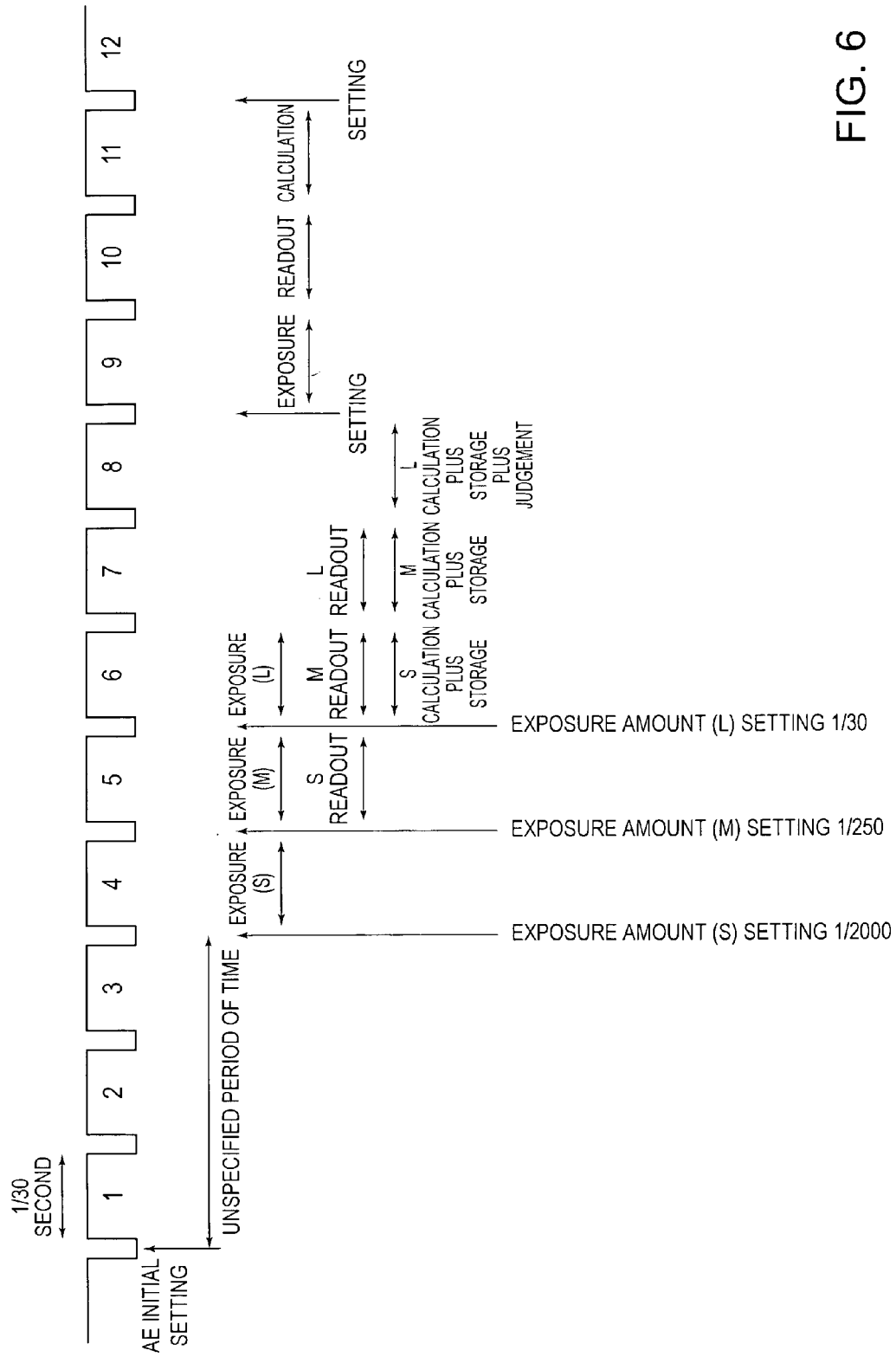
FIG. 6 is a timing chart explaining the operation of one embodiment.

The above operation is shown in the timing chart of FIG. 6. After the release switch 10 is in a semi-depression state, the operation is in standby from the first frame through the third frame (i.e., an unspecified period of time). The exposure amount S (shutter time=$1/2000$ sec.) is set in vertically synchronous signal timing directly before the fourth frame. Then, in the fourth frame, exposure is performed corresponding to the exposure amount S. When the exposure corresponding to the exposure amount S ends, the exposure amount M ($1/250$ sec.) is set, in vertically synchronous signal timing, directly before the fifth frame. In the fifth frame, in conjunction with exposure being performed corresponding to the exposure amount M, a readout is made of the exposure corresponding to the exposure amount S in the fourth frame.

Furthermore, the setting of the exposure amount L ($1/30$ sec.) is performed in vertically synchronous signal timing directly before the sixth frame. In the sixth frame, in conjunction with exposure being performed corresponding to the exposure amount L in the sixth frame, a readout is performed of the exposure corresponding to the exposure amount M performed in the fifth frame. Furthermore, in the sixth frame, the signal is calculated corresponding to the exposure amount S that was performed in the fourth frame and was readout in the fifth frame and this calculation result is eventually stored.

In the seventh frame, a readout is performed of the exposure corresponding to the exposure amount L performed in the sixth frame, a calculation and storage is made of the exposure result of exposure amount M that was readout in the sixth frame.

In the eighth frame, a calculation is made and stored in the buffer memory 37 of the exposure amount L that was readout in the seventh frame. In this eighth frame, a comparison of the signal levels is made, of the signal corresponding to the exposure amount S stored in the sixth frame, the signal corresponding to the exposure amount M stored in the seventh frame and the signal corresponding to the exposure amount L stored in the eighth frame. The shutter time corresponding to the value closest to the optimum value (128) is selected. That is, one shutter time, among $1/2000$ sec., $1/250$ sec., and $1/30$ sec., is selected.

In vertically synchronous signal timing directly before the ninth frame, the value of added value α is added to that time and the shutter time is set. Then, in the ninth frame, exposure is performed corresponding to this setting. In the tenth frame, a signal load readout is made corresponding to the exposure performed in the ninth frame. In the eleventh frame, a calculation is made to determine the signal level that was readout in the tenth frame. Then, corresponding to this calculation result, in vertically synchronous timing of the following twelfth frame, a new exposure amount setting is made. The operation is executed in repetition in the same way until the optimum signal level (128±3) is obtained.

Figure 7:
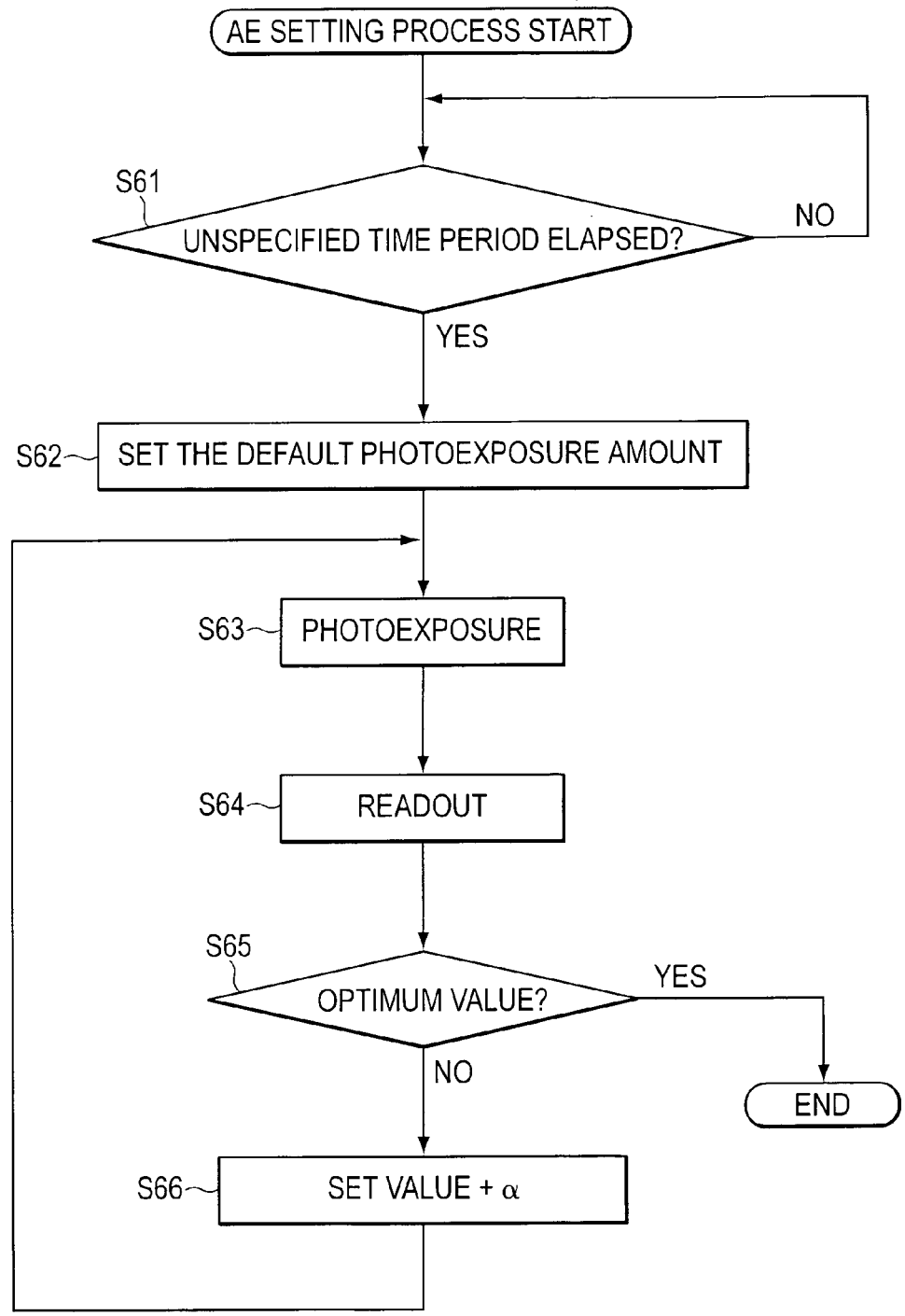
FIG. 7 is a flow chart explaining the operation in a conventional electronic camera.
Figure 8:
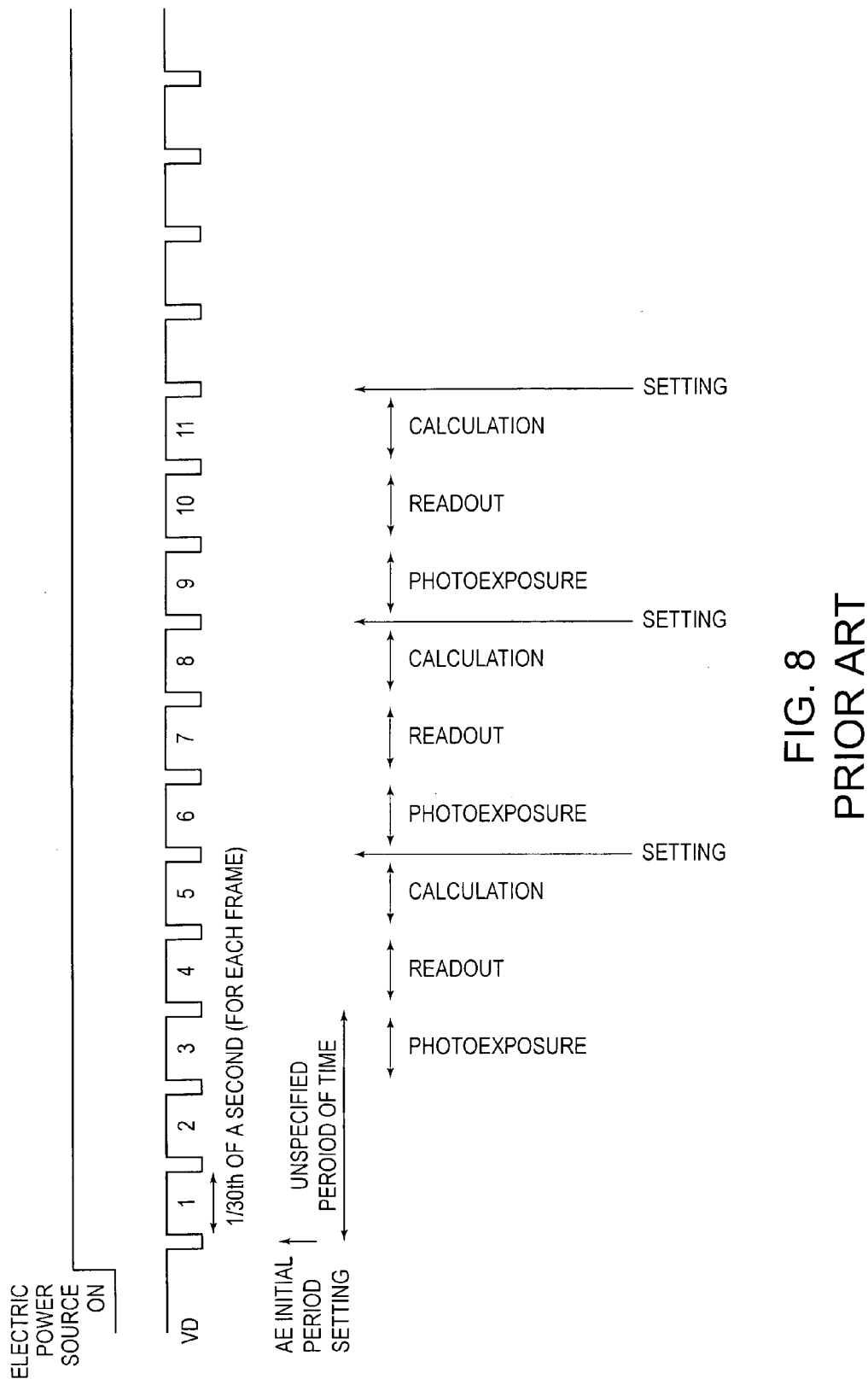
FIG. 8 is a timing chart explaining the operation in a conventional electronic camera.

As is clear from comparing FIG. 6 to FIG. 8, in the timing chart of FIG. 8, although the exposure amount is determined as set in vertically synchronous signal timing directly before the ninth frame in the timing chart of FIG. 6, this requires a lot of time. With regard to this, in FIG. 6, the exposure amounts set in vertically synchronous signal timing directly before the ninth frame are set corresponding to the value closest to the optimum shutter time, such as shutter times of $1/2000$ sec., $1/250$ sec. or $1/30$ sec. From the ninth frame on, operation is performed in the same way as is the operation of the third frame in FIG. 8. In this way, three comparatively greatly separated exposure amounts are set and the exposure amount obtaining the optimum signal value from among these amounts is selected. The selected exposure amount is changed slowly by a sufficient small added values α. As a result, an optimum exposure amount can be rapidly determined.

The first three exposure amounts are set in the above described embodiment. However, two exposure amounts may also be set.

The stop may also be fixed and the exposure amount is changed only by the shutter time. However, it is possible to change the exposure amount by changing only the stop value, by changing the combination of the stop value and the shutter time or by changing the combination of the stop value, the shutter time and the signal level (automatic gain control) (AGC).

For example, the above exposure amounts L, M, and S can be set with a fixed shutter time and signal level (AGC) and a stop value (F) may be regulated in the following way:

L: F1.4
M: F4
S: F11

Further, the exposure amounts L, M, and S can be set with a fixed AGC, and a stop value (F) and shutter time T (in seconds) set in the following way:

L: F2.8 T=$1/60$
M: F4 T=$1/250$
S: F8 T=$1/500$

Moreover, after an approximate exposure amount is determined, the shutter time is changed only by α in determining a further accurate exposure amount. This is done by micro-manipulation. While this may be done by controlling the stop as well as by micro-manipulation, the stop generally is notched only at $1/2$ EV. That is, as this is controlled in small values, it is preferable to minutely change the exposure amount by controlling the shutter time as shown in the above embodiment. However, the shutter time may be controlled by one horizontally synchronous unit (63.5 μs). Therefore, when it is necessary to provide control to an even higher degree of precision, it is preferable to combine control of the signal level with control of the shutter time.

Or, in a further combination of these, with regard to subjects of low brightness, (i.e., shutter time longer than $1/60$ sec.), the exposure amount is controlled by combining the stop and the gain control. Also, with regard to a subject of medium brightness, the exposure amount may be controlled by fixing the gain control, by the shutter time and by the stop value. Further, with a high degree of brightness, the exposure amount can also be controlled, by making the stop value the smallest stop value, by the gain control and by the shutter time.

The optimum exposure amount may be rapidly determined by determining the optimum exposure amount based on the output of the photoreceptor device, by changing the exposure amount incrementally by only a prescribed value that is sufficiently smaller than a difference between a first exposure amount and a second exposure amount.

While the invention has been described in relation to the preferred embodiments, many modifications and variations are apparent from the description of the invention, and all such modifications and variations are intended to be within the scope of the present invention as defined in the appended claims.

What is claimed is:

1. A method of calculating an optimum exposure amount of an electronic camera in a short period after beginning a prepare operation of exposure, the electronic camera having a photoreceptor device that receives light from a subject and outputs signals corresponding to an image of the subject, the method comprising the steps of:

performing a first exposure operation of the photoreceptor device at a fixed first exposure amount after insecurity period of the photoreceptor device from beginning a prepare operation of exposure to obtain a first output, the fixed first exposure amount being set without calculating the fixed first exposure amount;

performing a second exposure operation of the photoreceptor at a fixed second exposure amount after the first exposure operation to obtain a second output, the fixed second exposure amount being set without calculating the fixed second exposure amount;

calculating a first signal level based on the first output;

calculating a second signal level based on the second output;

comparing the first signal level with the second signal level and selecting the signal level closest to a predetermined exposure amount as a selected exposure amount;

determining an optimum exposure amount by changing the selected exposure amount by a prescribed amount smaller than a difference between the fixed first exposure amount and the fixed second exposure amount; and performing an optimum exposure operation of the photoreceptor device at the determined optimum exposure amount for recording the image.

2. The method of claim 1, further comprising the steps of:

performing an exposure operation at the changed selected exposure amount to obtain a third output; and further changing the previously selected exposure amount until the third output is within a predetermined range of the predetermined exposure amount.

3. The method of claim 1, further comprising the steps of:

prior to the comparing step, performing a third exposure operation of the photoreceptor device at a fixed third exposure amount after the second exposure operation to obtain a third output, the fixed third exposure amount being set without calculating the fixed third exposure amount; and calculating a third signal level based on the third output, wherein the comparing step compares the first signal level, the second signal level and the third signal level to select the signal level closest to the predetermined exposure amount as the selected exposure amount.

4. The method of claim 3, wherein the prescribed amount is smaller than a difference between the fixed first exposure amount and the fixed second exposure amount and is smaller than a difference between the fixed second exposure amount and the fixed third exposure amount.

5. The method of claim 3, wherein the fixed first exposure amount, the fixed second exposure amount and the fixed third exposure amount are different shutter speeds.

6. The method of claim 1, further comprising the step of storing the first output and the second output prior to the comparing step.

7. An electronic camera, comprising:

a photoreceptor device that receives light from a subject and outputs signals corresponding to an image of the subject;

a setting device that sets an exposure at a time of photographing the subject; and a calculation device that calculates an optimum exposure amount in a short period after beginning a prepare operation of exposure to be set by the setting device, wherein a first output of the photoreceptor device is determined when a fixed first exposure amount is set by the setting device without calculating the fixed first exposure amount and the subject is photographed, a second output of the photoreceptor device is determined when a fixed second exposure amount is set by the setting device without calculating the fixed second exposure amount and the subject is photographed after the first exposure operation, the calculation device compares the first output and the second output and the one closest to a predetermined exposure amount is selected as a selected exposure amount, the predetermined exposure amount is determined based on the output of the photoreceptor device, wherein the calculation device determines the optimum exposure amount by changing the selected exposure amount by a prescribed amount smaller than a difference between the fixed first exposure amount and the fixed second exposure amount; and a controller that performs an optimum exposure operation of the photoreceptor device at the determined optimum exposure amount for recording the image.

8. The electronic camera of claim 7, wherein a third output of the photoreceptor device is determined when a fixed third exposure amount is set by the setting device without calculating the fixed third exposure amount and the subject is photographed, the calculation device compares the first output, the second output and the third output and the one closest to the predetermined exposure amount is selected as the selected exposure amount, wherein the selected exposure amount is incrementally changed by the prescribed value that is smaller than the difference between the fixed first exposure amount and the fixed second exposure amount and is smaller than the difference between the fixed second exposure amount and the fixed third exposure amount.

9. The electronic camera of claim 8, wherein a ratio of light of the fixed first exposure amount, the fixed second exposure amount and the fixed third exposure amount is 1:8:64.

10. The electronic camera of claim 8, wherein the fixed first exposure amount, the fixed second exposure amount and the fixed third exposure amount correspond to different shutter speeds.

11. The electronic camera of claim 7, wherein signals corresponding to the first output and the second output are stored in a memory device.

12. The electronic camera of claim 7, wherein the electronic camera continues to change the selected exposure amount until an output of the photoreceptor device corresponding to the selected exposure amount is within a predetermined range of the optimum exposure amount.

* * * * *